US007621453B2

(12) United States Patent
Hepworth et al.

(10) Patent No.: US 7,621,453 B2
(45) Date of Patent: Nov. 24, 2009

(54) SYSTEM AND METHOD FOR CONTROLLING THE DISTRIBUTION OF DATA TRANSLATION COMPONENTS TO PORTABLE DATA COLLECTION DEVICES

(75) Inventors: Paul Hepworth, Riverton, UT (US); Weiyang Zhou, Sandy, UT (US)

(73) Assignee: The Code Corporation, Bluffdale, UT (US)

( * ) Notice: Subject to any disclaimer, the term of this patent is extended or adjusted under 35 U.S.C. 154(b) by 667 days.

(21) Appl. No.: 11/361,065

(22) Filed: Feb. 23, 2006

(65) Prior Publication Data

US 2006/0138236 A1 Jun. 29, 2006

Related U.S. Application Data

(63) Continuation-in-part of application No. 10/774,245, filed on Feb. 6, 2004, now Pat. No. 7,097,099, which is a continuation-in-part of application No. 10/623,747, filed on Jul. 21, 2003, now Pat. No. 7,392,933.

(60) Provisional application No. 60/399,215, filed on Jul. 29, 2002.

(51) Int. Cl.
*G06K 7/10* (2006.01)
*G06K 7/00* (2006.01)

(52) U.S. Cl. .............. 235/454; 235/462.01; 235/462.15

(58) Field of Classification Search ................. 235/454, 235/435, 462.01, 462.15, 462.25
See application file for complete search history.

(56) References Cited

U.S. PATENT DOCUMENTS 3,513,320 A 5/1970 Weldon
4,319,336 A 3/1982 Anderson et al.

(Continued)

FOREIGN PATENT DOCUMENTS

EP 0837406 A2 4/1998

(Continued)

OTHER PUBLICATIONS

"Punched Cards to Bar Codes," Benjamin Nelson, Helmers Publishing, Inc. 1997, pp. 1-16.

(Continued)

*Primary Examiner*—Daniel A Hess
(74) *Attorney, Agent, or Firm*—Austin Rapp & Hardman

(57) ABSTRACT

A system (10) includes a data collection device (12) for reading a machine readable data storage medium (38) and generating formatted data in accordance with data manipulation commands of a rules file (43). A protected rule file creation system: i) generates the rule file (43); ii) encrypts the rule file (43) to generate a protected rule file (39) which, when deciphered using a source key (31) yields the rule file (43); and iii) generates a license record (35). The license record (35) comprises the source key (31) and a source identifier (168). A trusted license file distribution system (17) encrypts the license record (35) using a private key (97) of a public/private key pair to generate a license file (41). The data collection device (12) comprises: i) a non-volatile memory storing a reader ID (93) and a public key (95); and ii) a processor (20) operating a decoder (72) and an interpreter (84). The interpreter (84) receives decoded data (134) from the decoder (72) and manipulates the decoded data (134) in accordance with the plurality of data manipulation commands defined in the rule file (43) to generate the formatted data (136). The interpreter module (84) obtains the rule file (43) by: i) receiving the protected rule file (39); ii) receiving the license file (41); iii) deciphering the license record (35) of the license file (41) using the public encryption key (95); and iv) if the identification of an authorized reader (37) matches the reader ID (93), deciphering the protected rule file (39) using the source license key (31) to recover the rule file (43).

23 Claims, 8 Drawing Sheets

U.S. PATENT DOCUMENTS 4,488,679 A 12/1984 Bockholt et al.
4,654,718 A 3/1987 Sueyoshi
4,752,675 A 6/1988 Zetmeir
4,896,029 A 1/1990 Chandler et al.
4,958,064 A 9/1990 Kirkpatrick
4,998,010 A 3/1991 Chandler et al.
5,047,614 A 9/1991 Bianco
5,113,445 A 5/1992 Wang
5,153,418 A 10/1992 Batterman et al.
5,159,635 A 10/1992 Wang
5,189,292 A 2/1993 Batterman et al.
5,223,701 A 6/1993 Batterman et al.
5,343,028 A 8/1994 Figarella et al.
5,352,878 A 10/1994 Smith et al.
5,412,196 A 5/1995 Surka
5,428,211 A 6/1995 Zheng et al.
5,438,188 A 8/1995 Surka
5,465,291 A 11/1995 Barrus et al.
5,478,999 A 12/1995 Figarella et al.
5,483,052 A 1/1996 Smith, III et al.
5,493,105 A 2/1996 Desai
5,545,887 A 8/1996 Smith et al.
5,604,640 A 2/1997 Zipf et al.
5,612,527 A 3/1997 Ovadia
5,804,803 A 9/1998 Cragun et al.
5,869,819 A 2/1999 Knowles et al.
5,903,729 A 5/1999 Reber et al.
5,905,248 A 5/1999 Russell et al.
5,905,251 A 5/1999 Knowles
5,933,634 A 8/1999 Enokido et al.
5,933,829 A 8/1999 Durst et al.
5,938,726 A 8/1999 Reber et al.
5,978,773 A 11/1999 Hudetz et al.
5,992,752 A 11/1999 Wilz, Sr. et al.
6,012,102 A 1/2000 Shachar
6,027,024 A 2/2000 Knowles
6,032,195 A 2/2000 Reber et al.
6,068,188 A 5/2000 Knowles
6,076,733 A 6/2000 Wilz, Sr. et al.
6,098,106 A 8/2000 Philyaw et al.
6,108,656 A 8/2000 Durst et al.
6,138,151 A 10/2000 Reber et al.
6,154,738 A 11/2000 Call
6,273,340 B1 * 8/2001 Rivailler .................... 235/494
6,328,211 B1 12/2001 Wilz, Sr. et al.
6,377,986 B1 4/2002 Philyaw et al.
6,384,744 B1 5/2002 Philyaw et al.
6,535,883 B1 3/2003 Lee et al.
6,564,249 B2 5/2003 Shiigi
6,584,601 B1 6/2003 Kodosky et al.
6,604,157 B1 8/2003 Brusky et al.
7,028,902 B2 * 4/2006 Xu et al. ................. 235/462.1
7,097,099 B2 * 8/2006 Hepworth et al. ........... 235/435
7,392,933 B2 * 7/2008 Hepworth et al. ........... 235/375
2002/0144017 A1 10/2002 Hepworth et al.
2002/0147743 A1 10/2002 Le et al.
2002/0149793 A1 10/2002 Hepworth et al.
2002/0152241 A1 10/2002 Hepworth et al.
2003/0088643 A1 5/2003 Shupps et al.
2003/0163396 A1 8/2003 Blankevoort et al.
2003/0163800 A1 8/2003 Zhou et al.
2004/0030991 A1 2/2004 Hepworth et al.

FOREIGN PATENT DOCUMENTS

WO 98/03923 1/1998
WO 98/06055 2/1998
WO 98/24036 6/1998
WO 98/40823 9/1998
WO 98/49813 11/1998
WO 99/04326 1/1999

OTHER PUBLICATIONS

"MiniCode," http://www.omniplanar.com/minicode.html, pp. 1-10, May 17, 1999.
Inernet Article: "An early history of software engineering by Robert L. Glass" copyright 1999; posted by Ken Anderson.

* cited by examiner

85/43

102

```
200 extract ".+"
   # DATE (mm/dd/yy to dd/mm/20yy)
   210 extract "(^|;)[0-9]{2}/[0-9]{2}/[0-9]{2}(;|$)"
      211 deleteAll ";"
      212 extractRange 1 3
      213 insert 4 extracted
      214 insert 7 "20"
      215 passthrough buffer
      216 passthrough ","

   # STC
   220 extract "(^|;)[0-9A-Za-z]{6}(;|$)"
      221 deleteAll ";"
      222 passthrough buffer
      223 passthrough ","

   # QTY
   230 extract "(^|;)[0-9]{4}(;|$)"
      231 deleteAll ";"
      232 passthrough buffer

   240 extract".+"
      241 deleteFirst ".+"
```

Figure 8

| | Command Set 87 | |
|---|---|---|
| 87 | extract *pattern* | 87a |
| | extractRange *start count* | 87b |
| | insert *position arg* | 87c |
| | deleteFirst *pattern* | 87d |
| | deleteAll *pattern* | 87e |
| | deleteRange *start count* | 87f |
| | translateFirst *old new* | 87g |
| | translateAll *old new* | 87h |
| | tag *arg* | 87i |
| | accept *arg* | 87j |
| | route *port format tag tag tag . . .* | 87k |
| | passthrough *arg* | 87m |

Figure 9

SYSTEM AND METHOD FOR CONTROLLING THE DISTRIBUTION OF DATA TRANSLATION COMPONENTS TO PORTABLE DATA COLLECTION DEVICES

CROSS REFERENCE TO RELATED APPLICATIONS

The present application is a continuation-in-part of U.S. patent application Ser. No. 10/774,245 titled "Data Collection Device With Integrated Data Translation," with inventors Paul Hepworth and George Powell, which was filed on Feb. 6, 2004 now U.S. Pat. No. 7,097,099. Application Ser. No. 10/774,245 is a continuation-in-part of U.S. patent application Ser. No. 10/623,747 titled "Systems and Methods for Interfacing Multiple Types of Object Identifiers and Object Identifier Readers to Multiple Types of Applications," with inventors Paul J. Hepworth, George Powell, and Weiyang Zhou, which was filed on Jul. 21, 2003 now U.S. Pat. No. 7,392,933. Application Ser. No. 10/623,747 claims priority from U.S. Provisional Patent Application Ser. No. 60/399,215 titled "System and Method of Interfacing Multiple Types of Object Identifiers and Object Identifier Readers to Multiple Types of Applications," with inventors Paul Hepworth, George Powell, and Weiyang Zhou, which was filed on Jul. 29, 2002. The contents of application Ser. Nos. 10/774,245, 10/623,747 and Application No. 60/399,215 are hereby incorporated by reference in their entirety.

TECHNICAL FIELD

The present invention relates generally to a data collection device for obtaining data from a machine readable data storage medium. More specifically, the present invention relates to controlling distribution of data translation functions useful for manipulating and routing data read from a machine readable data storage medium.

BACKGROUND OF THE INVENTION

A machine readable data storage medium is used to store data related to a document, product, or other tangible object to which the data storage medium is embedded or attached. Examples of such storage media include radio frequency identification tags, magnetic stripes, and machine-readable graphical codes.

A graphical code is a graphical representation of information that consists of multiple code elements having different light reflective or light emissive properties. Examples of types of graphical codes include bar codes, data matrix codes, MaxiCodes, MICR text, optical character recognition text, and similarly formatted data.

Traditional data collection devices, for example data collection devices for reading graphical codes (including linear laser scanners, raster laser scanners, linear CCD imaging readers, and 2D array imaging readers) detect illumination reflected from a graphical code and generate a digital signal representative of the reflected illumination.

The digital signal is provided to an embedded decoder system (e.g. a processor which executes a decoder application from firmware) which generates a decoded value. The decoder system not only decodes the digital signal, but it also drives a serial interface circuit (such as a UART) for transmitting the decoded value to a compatible serial interface circuit of a remote computer running a software application that will use the decoded value (e.g. a data collection application).

Traditional data collection devices such as RFID tag readers detect a modulated RF signal carrier emitted from the tag and generate a digital signal representative of base band data. The digital signal is provided to an embedded decoder system. Again, the decoder system not only decodes the digital signal, but it also drives a serial interface circuit for transmitting the decoded value to a compatible serial interface circuit of a remote computer running a data collection application.

In all such data collection devices, it is possible to customize the decoder firmware such that it makes format changes in the decoded value before output to the serial interface circuit. Examples of format changes that are readily implemented in customized decoder firmware include: i) adding and/or deleting prefix characters to the decoded data; and ii) adding and/or deleting suffix characters to the decoded data.

It is common for a company that is replacing existing data collection devices with new data collection devices to require that the supplier of the new data collection devices write customized decoder firmware such that the data output by the new data collection devices has the same prefix and suffix characters as data output by the existing data collection devices. This solution is more desirable than modifying legacy systems to accept decoded data in a different format. It is also more desirable than writing, installing, and maintaining a middleware application to run in conjunction with the data collection application for the purpose of converting decoded data to a format compatible with the legacy data collection application.

However, there are several problems associated with customizing decoder firmware. First, source code to the decoder firmware is typically proprietary to the manufacturer of the reader. As such, the end user of a reader does not have access to the source code and, if the end user desires custom firmware, the end user will contract with the data collection device manufacturer to write the customizations. This process includes the time and cost inefficiencies that typically exist when one entity specifies a requirement and contracts with another entity to implement the specified requirement. This process also includes the time and cost inefficiencies of contracting with the reader manufacturer to manage version control and otherwise maintain the customized firmware.

U.S. patent application Ser. No. 10/774,245, to which this application is a continuation-in-part, discloses an integrated translation system for translating, formatting, and routing decoded data without requiring customized decoder firmware.

In general, the decoder firmware of the integrated translation system includes an interpreter module. The interpreter module receives decoded data and translates, manipulates, and routes the decoded data in accordance with a rule file loaded on the reader.

The rule file defines a plurality of data translation, manipulation, and routing commands to be performed on decoded data to generate formatted data. In the exemplary embodiment, the rule file is a script file and the data manipulation commands are defined utilizing text commands and arguments within a programming language recognized by the interpreter module.

A problem associated with the integrated translation system, unlike customized firmware, is that the vendor that creates the rule file has little control over its distribution after it is delivered to a customer.

For these reasons, what is needed is a system and method for enabling a data collection device to translate, format, and route decoded data in a specified format without requiring customized decoder firmware. More specifically, what is needed is a system and method for: i) enabling a data collection device to translate, format, and route decoded data in a format specified in a selected script file; and ii) for controlling distribution and use of such a script file.

SUMMARY OF THE INVENTION

The present invention relates to a system that includes a data collection device for reading a machine readable data storage medium and generating formatted data in accordance with data manipulation rules of a rule file.

A protected rule file creation system: i) generates the rule file; ii) encrypts the rule file to generate a protected rule file which, when deciphered using a source key yields the rule file; and iii) generates a license record. The license record comprises the source key, a source identifier, and an expiration date.

A trusted license file distribution system encrypts the license record using a private key of a public/private key pair to generate a license file.

The data collection device comprises: i) a non-volatile memory (such as a one-time programmable (OTP) device) storing a reader ID and a public key; and ii) a processor operating an embedded decoder system. The embedded decoder system comprises a decoder module and an interpreter module.

The decoder module receives digital data representing the machine readable data storage medium from a medium reading system and generating decoded data.

The interpreter module receives the decoded data and manipulates the decoded data in accordance with the plurality of data manipulation commands defined in the rule file to generate the formatted data.

The interpreter module obtains the rule file by: i) receiving the protected rule file; ii) receiving the license file; iii) deciphering the license record of the license file using the public encryption key and a predetermined asymmetric encryption algorithm; and iv) if the identification of an authorized reader from the license record matches the reader ID, deciphering the protected rule file using the source license key to recover the rule file.

In one embodiment the license file is obtained by the reading system capturing encoded data of a machine readable data storage medium which includes encoded data representing the license file. The decoder module receives the encoded data and generates a decoded representation of the license file.

A license file handling module (of the interpreter module): i) receives the decoded data (representing the license file) from the decoder module; ii) recognizes the presence of a license file within decoded data; iii) obtains the public encryption key and deciphers the license record of the license file; and iv) stores the source license key in non-volatile memory in combination with the source identification if the reader ID matches the identification of an authorized reader from the license record. The license may be stored in its encrypted form.

In a sub embodiment, the license file handling module only stores the source license key in combination with the source identification in the non-volatile memory if the expiration date of the license record has not yet passed.

In yet another embodiment, the protected rule file is obtained by the reading system capturing encoded data of a machine readable data storage medium which includes encoded data representing the protected rule file. The decoder module then receives digital data from the reading system representing the protected rule file and generates a decoded representation of the protected rule file.

A preprocessor of the interpreter module: i) receives the decoded data (representing the protected rule file) from the decoder module; ii) recognizes the presence of a protected rule file within decoded data; iii) determines the source identification associated with the protected rule file; iv) obtains the source license key associated with the source identification; iv) deciphers the protected rule file using the source license key to recover the rule file, and v) compiles the deciphered rule file for execution by the interpreter module.

An expression library of the interpreter module comprises a plurality of data manipulation commands and, in association with each of the plurality of data manipulation commands, an instruction for performing the data manipulation command. The interpreter module provides for manipulating the decoded data by, for each data manipulation defined in the rule file, performing the instruction associated with the data manipulation.

For a better understanding of the present invention, together with other and further aspects thereof, reference is made to the following description, taken in conjunction with the accompanying drawings. The scope of the invention is set forth in the appended claims.

BRIEF DESCRIPTION OF THE DRAWINGS

FIG. 8 is script representing a rule file in accordance with one embodiment of the present invention; and FIG. 9 is an exemplary command set in accordance with one embodiment of the present invention;

DETAILED DESCRIPTION OF THE INVENTION

Figure 1:
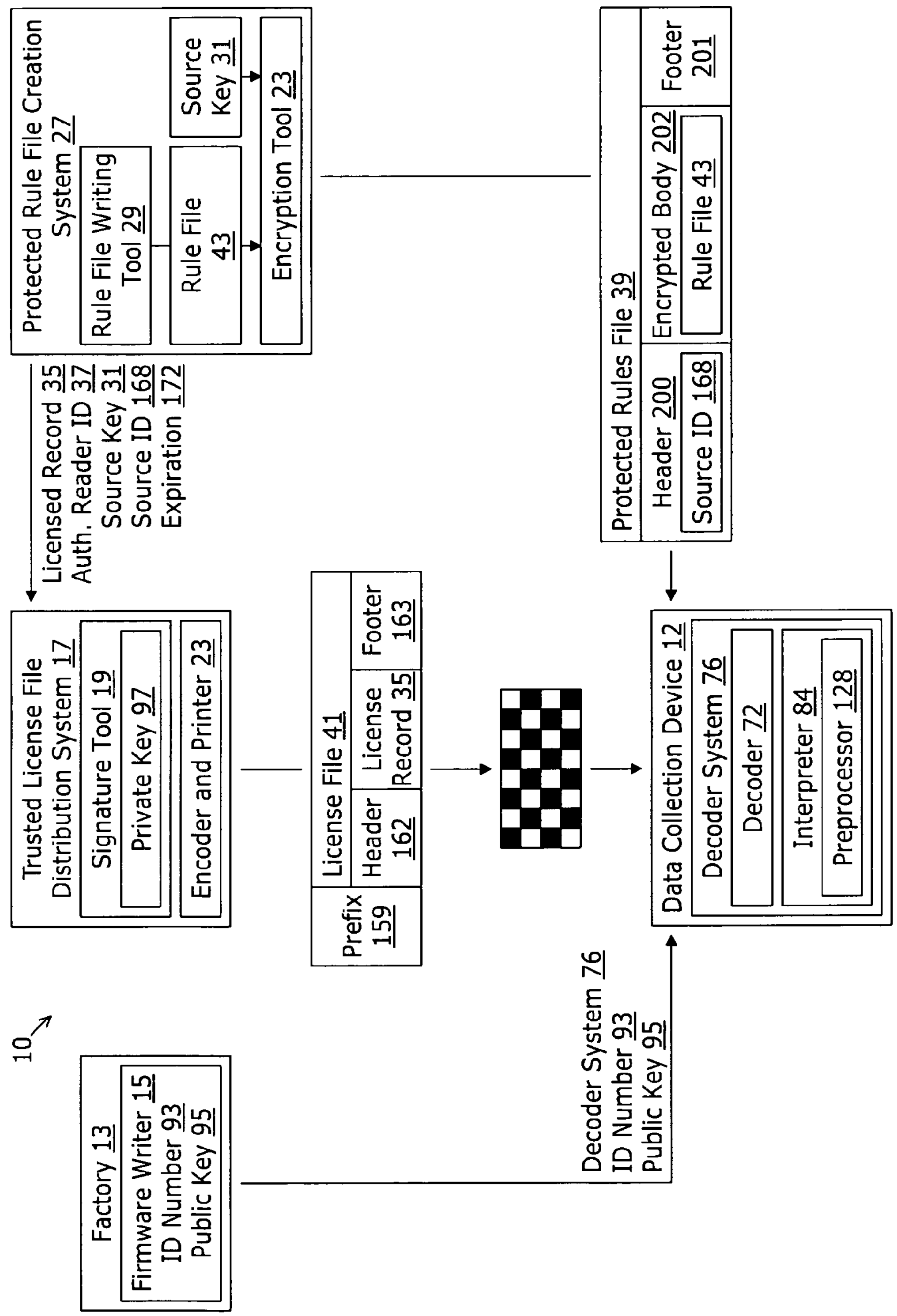
FIG. 1 is a block diagram representing an overview of a system for controlling distribution of data translation instructions to portable data collection devices in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Certain functions discussed in this specification have been grouped into elements referred to as circuits, modules, or engines. Such grouping of functions is for clarity of the discussion only and those skilled in the art of software design understand that grouping of functions within modular software design is a matter of design choice. Further, each such term circuit, module, or engine as used throughout this specification is intended to encompass a hardware circuit (whether discrete elements or an integrated circuit block), a processor executing embedded code, or a combination of a hardware circuit and a processor executing code, or other combinations of the above known to those skilled in the art.

Overview

FIG. 1 shows a block diagram of a system 10 for controlling distribution of data translation instruction files to portable data collection devices 12. The system 10 comprises a factory system 13, a trusted license file distribution system 17, a protected rule file creation system 27, and at least one data collection device 12. Although each of these components is shown as a separate component in FIG. 1, it is envisioned that components may be combined and components may be under control of the same entity, or separate entities.

In general the data collection device 12 includes a decoder firmware system 76 which comprises both a decoder 72 and an interpreter module 84. The decoder 72 decodes the data elements of a graphical code to generate decoded data. The interpreter module 84 translates, manipulates, and routes the decoded data in accordance with a plurality of data translation, manipulation, and routing commands within a rule file 43 provided to the data collection device 12 by the protected rule file creation system 27 as a protected rule file 39.

The factory system 13 comprises a firmware writer 15 which writes the decoder system 76 to non-volatile memory of the data collection device 12. The firmware writer 15 also writes an ID number 93 unique to the data collection device 12 and a public encryption key 95 to the non-volatile memory of the data collection device 12. The public encryption key 95 corresponds to a private encryption key 97 maintained by the trusted license file distribution system 17.

The protected rule file creation system 27 comprises a rule file writing tool 29, a source encryption key 31, and an encryption tool 33. In general, the rule file writing tool 29 generates the rule file 43. The rule file 43 is a script file including data manipulation commands defined using text commands and arguments within a programming language recognized by the interpreter module 84 of the decoder system 76 of the data collection device 12. A more detailed discussion of the rule file 43 and its operation with the interpreter module 84 is included herein with reference to FIGS. 7, 8, and 9.

The encryption tool 33 generates the protected rule file 39 by: i) encrypting the rule file 43 created by the rule file writing tool 29 using the source key 31 and a predetermined symmetric encryption algorithm to create an encrypted body 202; ii) appending a header 200 which includes a source ID 168 and a predetermined character string for identifying the encrypted body 202 as an encrypted representation of a rule file 43; and iii) appending a footer 201 to the encrypted body 202 to identify its end. The source ID 168 uniquely associates with the protected rule file creation system 27 that was used to encrypt the body 202. The protected rule file 39 is loaded on the data collection device 12.

The encryption tool 33 further generates a license record 35 by combining at least the source encryption key 31, the ID number of the reader which is to have access to the protected rule file 39 (e.g the authorized reader ID 37); the source ID 168, and an expiration date 172 of the license record 35. The license record 35 is passed to the trusted license file distribution system 17.

The trusted license file distribution system 17 includes a signature tool 19 and an encoder/printer tool 23. The signature tool 19 generates a license file 41 which includes an encrypted representation of the license record 35 provided by the protected rule file creation system 27, a header 162, and a footer 163. The signature tool 19 encrypts the license file 41 using the private key 97 which corresponds to the public key 95 provided to the data collection device 12 by the factory system 13. The header 162 may comprise a predetermined character string which, following decryption, is used to verify the validity of the license file 41 and mark the beginning of the license record 35. The footer 163 marks the end of the license record 35.

The encoder/printer tool 23 attaches a prefix 159 to the license file 41 and encodes the license file 41 (and prefix) into a graphical code format (such as the data matrix) and prints a license file graphical code 25. The prefix 159 may be a predetermined character string which identifies the encoded data as a license file 41.

The data collection device 12 obtains the license file 41 by reading the license file graphical code 25. A preprocessor 128 of the interpreter 84 deciphers the license file 41 using the public key 95 (provided by the factory system 13) to recover the authorized reader ID number 37 and the source key 31. If, and only if: i) the reader ID number 93 of the data collection device 12 matches the authorized ID number 37 from the license file 41; and ii) the source id 168 of the protected rule file 39 matches the source id 168 in the license file 41 the preprocessor 128: i) deciphers the encrypted body 202 of the protected rule file 39 using the source key 31 from the license file 41 to recover the rule file 43 originally generated by the rule file writing tool 29; and ii) installs the rule file 43 in a form useable by the interpreter 84 for translating, manipulating, and routing decoded data.

Although the above example contemplates providing the license file 41 to the data collection device 12 by encoding the license file 41 into a graphical code and reading of the graphical code by the data collection device 12, it is also envisioned that the license file 41 could be transmitted to the data collection device 12 over any communication channel such as an RS-232 or USB communication link.

Data Collection Device

Figure 2:
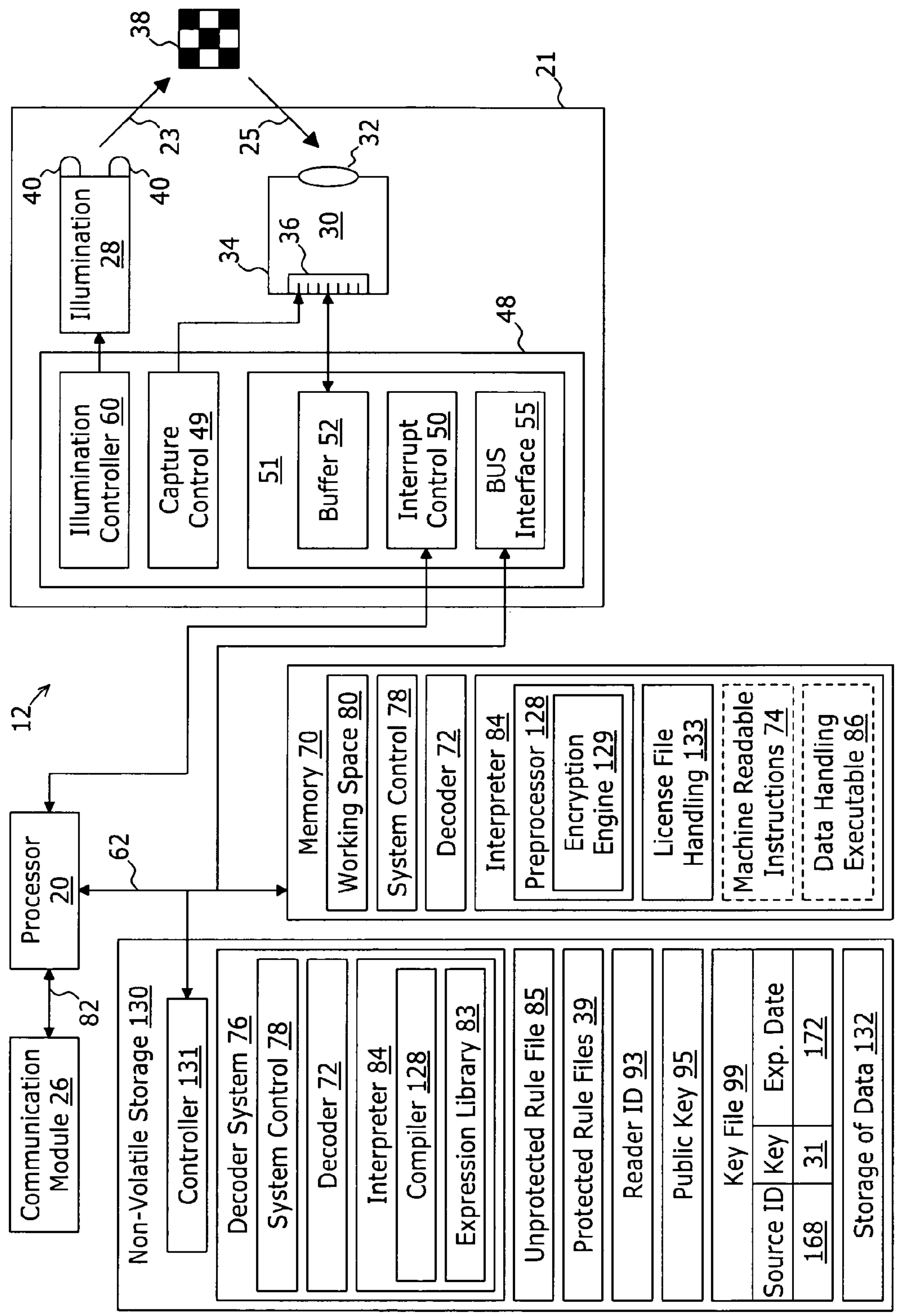
FIG. 2 is a block diagram of a data collection device in accordance with one embodiment of the present invention.

FIG. 2 shows a block diagram of an exemplary two dimensional imaging based code data collection device 12 useful in the system 10. Although the data collection device 12 will be described as embodied in such a 2D imaging based reader, it should be readily apparent to those skilled in the art that the invention may be readily implemented in a laser based data collection device (both linear and raster) or a linear photo sensor array data collection device.

The data collection device 12 comprises a code reading system 21, a processor 20, a random access memory 70, a non volatile storage (such as flash memory) 130, and a communication module 26.

In the exemplary embodiment, a bus 62 interconnects the processor 20 to each of a non-volatile storage controller 131 of the non-volatile storage 130, the memory 70, and the code reading interface circuit 48 of the code reading system 21. A peripheral bus 82 interconnects the processor 20 to the communication module 26.

The non-volatile storage 130 stores: i) the embedded decoder system 76, the reader ID 93, and the public encryption key 95 as stored therein by the factory system 13; ii) the protected rule file 39 as stored therein by the protected rule file creation system 27; iii) and an unprotected rule file 85 as stored therein by either the factory system 13 or the protected rule file creation system 27. The non-volatile storage 130 may further include files for the storage of data 132 generated during operation of the reader 10 if the reader 10 is a "batch mode" reader.

The unprotected rule file 85 includes data manipulation commands defined using text commands and argument within the programming language recognized by the interpreter module 84 of the decoder system 76 in a plain text format (or other format) compilable by the preprocessor 128 without first requiring decryption.

Upon start-up of the reader, the embedded decoder system 76 is loaded into memory 70 for execution by the processor 20. For purposes of illustrating the present invention, the embedded decoder system 76, when loaded into memory 70, comprises a system control module 78, a decoder module 72, and an interpreter module 84. The interpreter module 84 comprises a license file handling module 133, a preprocessor 128, and an encryption engine 129.

While each of the components is shown as a separate component or functional module on the block diagram of FIG. 2, it is envisioned that some of the components may be embedded within other components. For example, the processor 20 may include the communication module 26, and a portion of the memory 70 embedded within the processor 20. It is envisioned that even more components will be embedded within processors that are expected to be available in the future. As another example, each of the system controller 78, decoder 72, and interpreter 84 are shown as separate functional modules for purposes of facilitating discussion herein, however the functions of each may be combined in other functional groupings. Those skilled in the art will recognize that combining and embedding components does not alter the functionality required of each component to support the inventions described herein.

In general, the code reading system 21 captures an image of a graphical code 38 and writes digital image data to working space 80 in the memory 70. The processor: i) operating the decoder 72 that has been loaded into the memory 70, performs image processing and code element recognition to decode the image of the graphical code within the digital image data; and ii) operating the interpreter 84 that has been loaded into the memory 70, generates formatted data by translating, manipulating, and routing the decoded data in accordance with rule generated by the rule file creation system 27. The communication module 26, which may be a known communication controller system (such as a serial link UART, a network interface circuit, a BlueTooth wireless controller, an 802.11 wireless controller, or other known communication systems), transports formatted data to a remote computing system that utilizes the formatted data.

Figure 3:
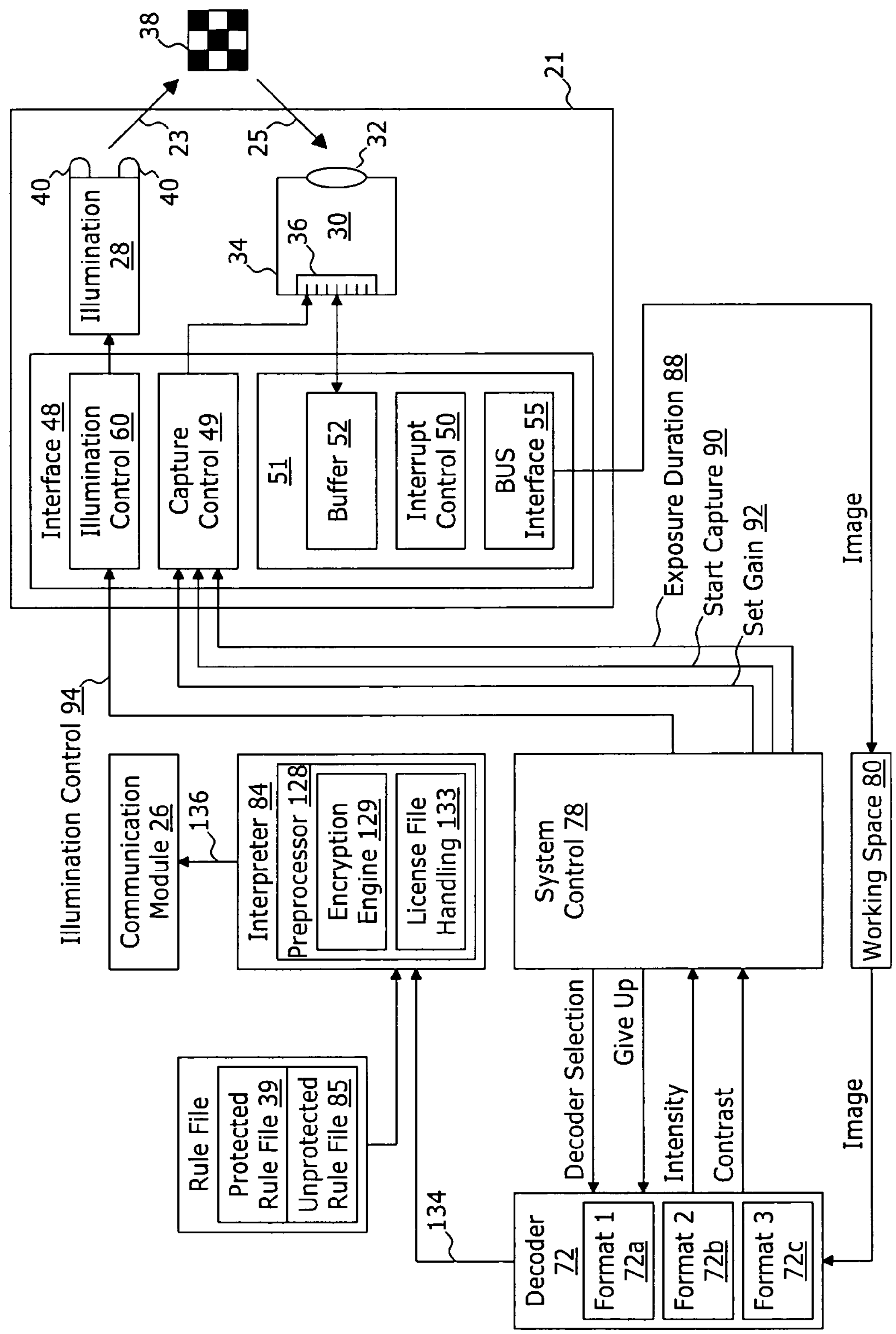
FIG. 3 is a block diagram representing exemplary interaction between various components of the data collection device of FIG. 2.

FIG. 3 is a block diagram useful for discussion of the operation and interaction between certain components in more detail. Referring to FIG. 3, the system control module 78 operates as the "hub" that controls the timing and sequence of processing calls to each of the decoder module 72, the interpreter module 84, and the components of the code reading system 21. When each such module or circuit has completed its operation, control is returned to the system control module 78.

Code Reading System

The code reading system 21 comprises a code reading interface circuit 48, an imaging module 30, and an illumination assembly 28. The code reading interface circuit 48 may be implemented on a field programmable gate array (FPGA), an application specific integrated circuit (ASIC), or similar circuit structure. The circuits of the code reading interface circuit 48 comprise an illumination control circuit 60, an image capture control circuit 49, and image storage circuits 51. The image storage circuits 51 include an image buffer 52, an interrupt control circuit 50, and a bus interface 55.

The illumination module 28 includes a plurality of illumination elements 40 and is coupled to the illumination control circuit 60. The illumination control circuit 60 powers each element 40 in response to illumination control signals 94 (both timing and illumination intensity) provided by the system control module 78.

The imaging module 30 includes a 2d photo sensor array system 36, a darkroom housing 34, and an optic system 32 which, in combination operate as a camera for capturing an image of a graphical code 38 within a target area.

The optic system 32 may include one or more lens elements for focusing an image of a graphical code 38 in the target area onto the matrix of light sensitive elements of the 2D photo sensor array system 36. A more detailed discussion of an exemplary optic system is included in U.S. Pat. No. 6,619,547, issued Sep. 16, 2003, for "Image-Based Graphical Code Reader Device with Multi-Functional Optical Element and Converging Laser Targeting," with inventors Blake Crowther, Ryan Hyde, Collin Lewis, and George Powell, the contents of which are incorporated herein by reference.

The darkroom housing 34 mounts the optic system 32 with respect to the photo sensor array system 36 such that an image of the target area is well focused onto the matrix of light sensitive elements and shields the light sensitive elements from ambient (unfocused) illumination.

Each light sensitive element accumulates a charge proportional to the intensity of illumination incident thereon over the duration of an exposure period. The 2d photo sensor array system 36, in addition to the matrix of light sensitive elements, includes array circuits which: i) start an exposure period, ii) sequentially read out the accumulated charge on each photo sensor element at termination of an exposure period to generate a voltage signal representing the sequential read out, iii) adjust gain of a voltage signal, and iv) generate digital image data which is a sequence of digital values representing the accumulated charge on each photo sensor element.

The array circuits that start an exposure period operate in response to receiving a "Start Capture" signal 90 from the system control module 78 (through the capture control circuits 49 of the code reading interface circuit 48) and terminate the exposure period after exposing the photo sensor elements for an "Exposure Duration" value 88 received from the system control module 78. The array circuits set the gain of the voltage signal in response to receiving a "Gain Value" 92 from the system control module 78.

The image storage circuits 51 serve the function of transferring the digital image data from the imaging module 30 to a working space 80 of the memory 70. More specifically: i) the image buffer 52 receives and stores digital image data from the imaging module 30; ii) the interrupt control circuit 50 functions to provide an interrupt signal to the processor 20 when the image buffer 52 is full; and iii) the bus interface circuit 55 operates to transport the digital image data over the bus 62 to the working space 80 utilizing either direct memory access, reading and writing sub-routes of the processor 20, or a combination thereof.

Decoder

The decoder module 72 performs applicable image processing and code element recognition to identify and decode the graphical code 38 within the digital image data. The decoder module 72 includes a plurality of decoders **72*a*-72*c***.

Each decoder 72a-72c, when operated by the processor 20, attempts to recognize and decode a graphical code of a certain format (UPC, Maxicode, PDF-417 ect) within the digital image data that has been stored in the working space 80 by the image storage circuits 51—and, if successful, generates decoded data 134. Each decoder 72a-72c is independently called by a decoder selection signal (and terminated by a give up signal) provided by the system control module 78.

The system control module 78 may select the order that each decoder 72a-72c is called (and the "give up" time allotted to each decoder) based on various techniques to optimize decoder performance.

Interpreter

The interpreter module 84 generates formatted data for output by the communication module 26 by translating, routing, and otherwise manipulating decoded data 134 as defined by a plurality of data manipulation commands set forth in the unprotected rule file 85 and the protected rule file 39.

In a first embodiment of the present invention, the interpreter module 84 includes a preprocessor 128 which: i) reads the data manipulation commands set forth in the unprotected rule file 85 and the protected rule file 39; and ii) compiles machine readable instructions 74. The interpreter module 84 further includes a data handling executable 86 (virtual machine) which, when executed from memory, accesses the machine readable instructions 74 to perform the translation, routing and manipulations of the decoded data 134.

In a second embodiment of the present invention, the interpreter module 84 includes a preprocessor 128 which: i) reads the data manipulation commands set forth in the unprotected rule file 85 and protected rule file 39; and ii) compiles a data handling executable file 86 in native machine language. As such, when the data handling executable file 86 is executed from memory 70, it performs the translation, routing, and manipulations of the decoded data 134.

As discussed, in order to compile a protected rule file 39, the preprocessor 128 requires the creators key 31 from a license file 41. As such, the interpreter 84 includes a license file handling module 133 for handling a license file 41 upon reading of a license file graphical code 25 (FIG. 1) and writing (in an encrypted form) the source key 31 in conjunction with the source ID 168 and the expiration date to a key file 99 in the storage 130.

Figure 4:
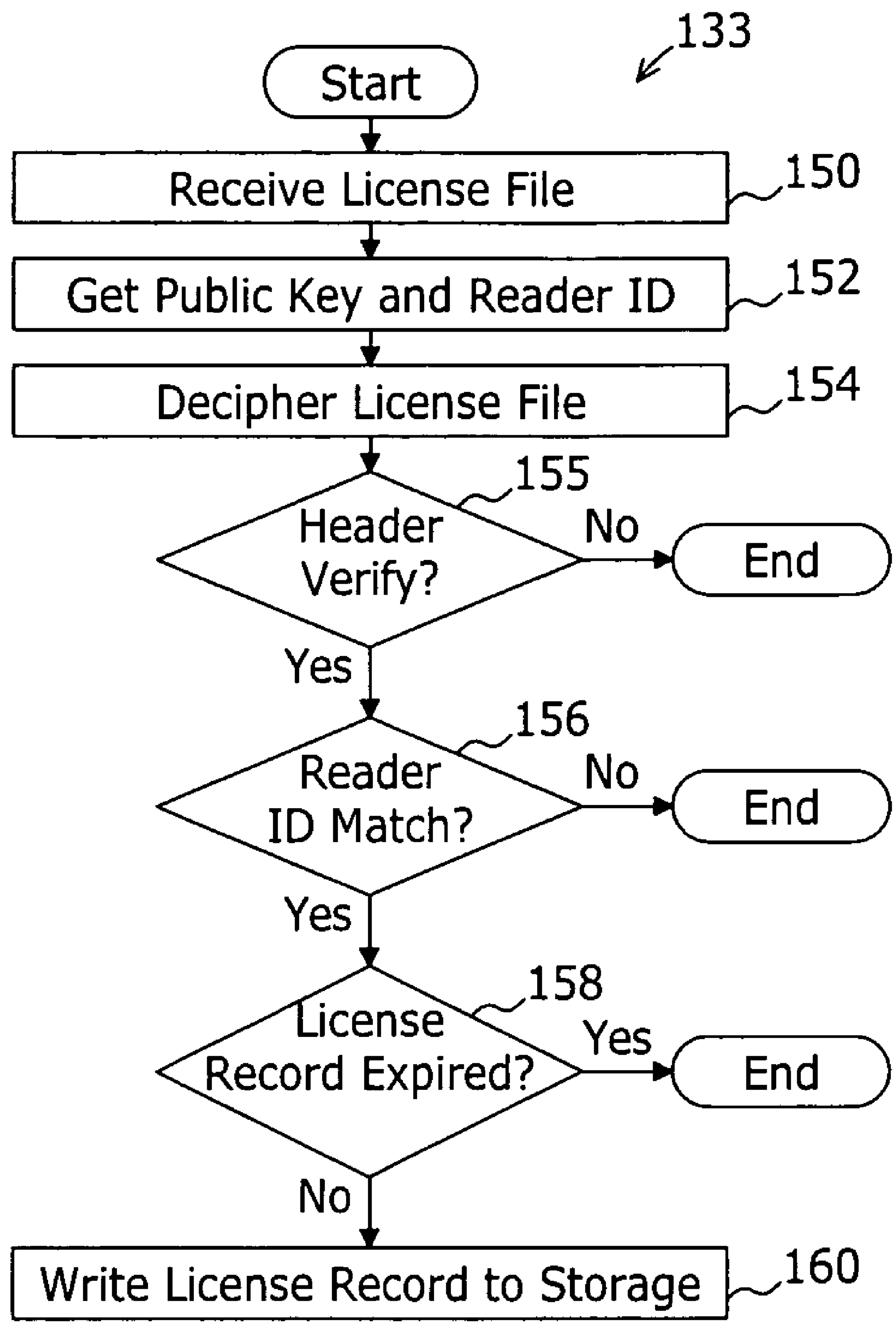
FIG. 4 is a flow chart representing operation of a license file handling module in accordance with one embodiment of the present invention.

The flow chart of FIG. 4 represents exemplary operation of the license handling module 133. Turning to FIG. 4 in conjunction with FIG. 1, step 150 represents receiving a license file 41 from the decoder 172. More specifically, step 150 represents the interpreter 84 recognizing a license file 41 by the prefix 159 appended to the license file 41 and passing the license file 41 to the license file handling module 133.

Step 152 represents retrieving the reader ID 93 and the public key 95 from the storage 130.

Step 154 represents using the public key 95 and the predetermined asymmetrical encryption algorithm to decipher the license file 41 to recover the license record 35, header 162, and footer 163

Step 155 represents comparing the deciphered header 162 with the predetermined header character string to verify the authenticity of the license file 41. If the two do not match, the license file handling module 133 discontinues processing and returns control to system control 78.

Step 156 represents comparing the reader ID 95 retrieved from storage 130 to the authorized reader ID 37 from the record 35 to assure that the license file 41 is the correct file for the data collection device 12 and to prevent the license file 41 from being used with other data collection devices. If the two do not match, the license file handling module 133 discontinues processing and returns control to system control 78.

Step 158 represents comparing the expiration date of the license file 41 to the then current date and time to determine whether the license e file 41 has expired. If the license file 41 has expired, the license file handling module 133 discontinues processing and returns control to system control 78.

So long as the license file 41 is the correct file for the data collection device 12 and so long as the license file 41 has not expired, each record 35 is stored in the key file 99 in the storage 130 at step 160.

Figure 5:
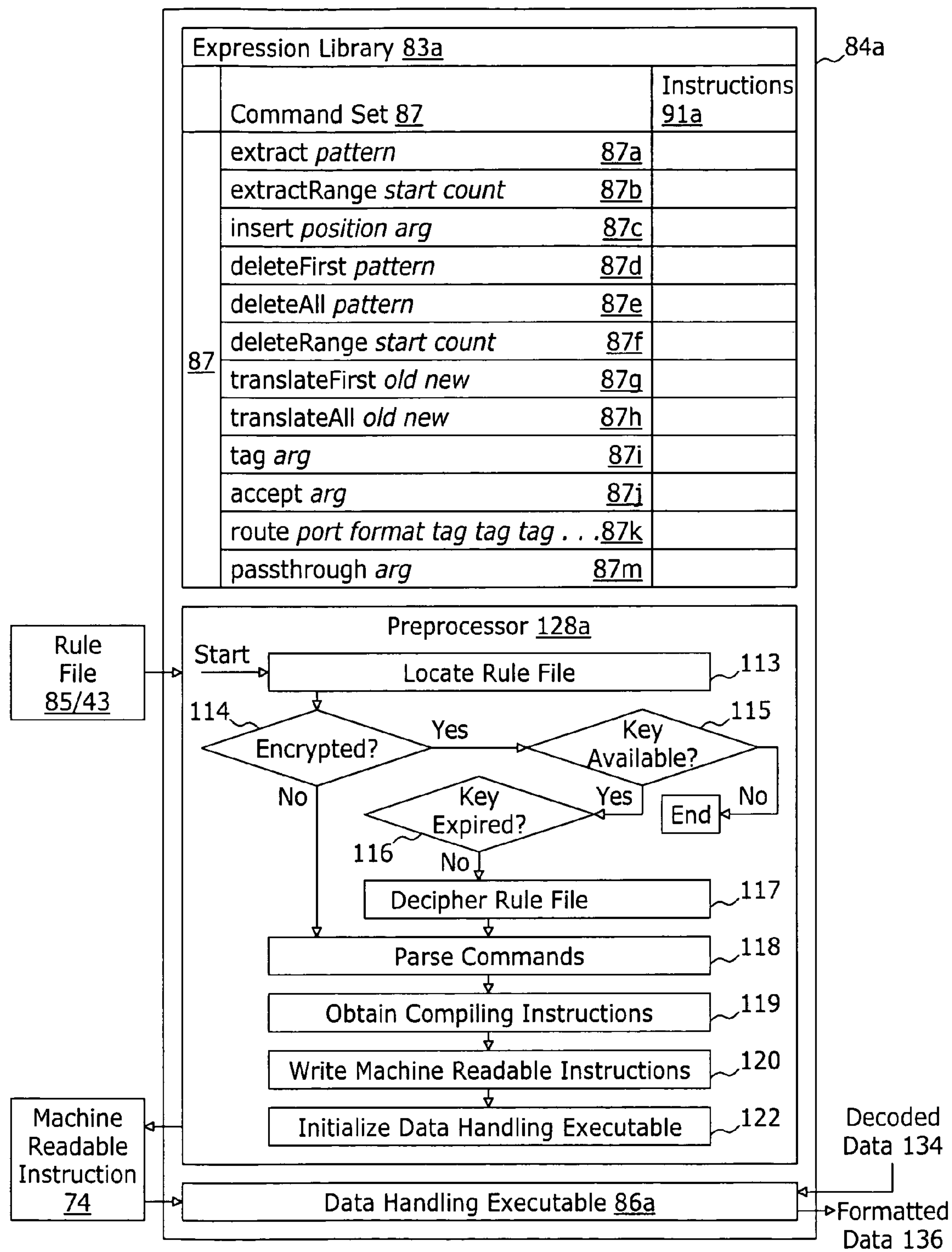
FIG. 5 is a block diagram representing an interpreter module in accordance with a first embodiment of the present invention.

The block diagram of FIG. 5 is useful for describing structure and operation of the first embodiment of the interpreter module 84 referred to as interpreter module 84a.

The interpreter module 84a may be of an architecture commonly known as a "Virtual Machine". The interpreter module 84a includes a preprocessor module 128a, a data handling module (e.g. a virtual machine executable module) 86a, and an expression library 83a. Those skilled in the art will recognize that the functions of the interpreter module 84a may be embodied in a general purpose scripting engine such as Awk, Perl, Python, JavaScript and other similar systems.

The expression library 83a comprises the command set 87 which is a plurality of data manipulation commands 87a-87m recognized by the preprocessor module 128. In association with each data manipulation command 87a-87m, the expression library 83a includes instructions 91a for compiling machine readable instructions 74 which, when retrieved by the data handling module 86a, instruct the data handling module to execute the data manipulation command 87a-87m.

The preprocessor module 128a comprises native machine executable code which, when executed by the processor 20: i) locates the unprotected rule file 85 or the protected rule file 39 at step 114; ii) deciphers a protected rule file 39, if applicable, at steps 114 through 117; iii) parses the rule file to obtain the plurality of data manipulation commands within the rule file at step 118; iii) obtains applicable compiling instructions 91a from the expression library 83a at step 119; iii) compiles the machine readable instructions 74 at step 120; and initializes the data handling executable 86a at step 122.

In the exemplary embodiment the preprocessor module 128a is run at power up of the reader 10 and compiles the machine readable instructions 74 only at power up.

To enable the preprocessor module 128a to locate the unprotected rule file 85 or the protected rule file 39 at step 114, the rule file may be distinguishable from other files stored in the non-volatile storage 130 by: i) its storage at a predefined location within the non-volatile storage such as a predetermined directory; ii) its storage under a file name with a predefined extension; and/or ii) its inclusion of predetermined file characteristics such as a header with leading characters that identify the file as a rule file.

To enable the preprocessor module 128 to decipher the encrypted body 202 of a protected rule file 39, steps 114 through 117 are preformed. Step 114 represents determining whether the rule file is encrypted. If not, steps 115 through 117 are skipped the unprotected rule file 85 is parsed at step 118. If the rule file is an encrypted rule file 39, step 115 represents determining whether a source key 31 is available in the key table 99 for deciphering the body 202 off the protected rule file 39. More specifically, the preprocessor 128a determines whether the key table contains a record with a source key 31 and a source ID 168 which matches the source ID 168 in the header of the encrypted rule file 39. If not, the protected rule file 39 can not be deciphered and compiling terminates. If a source key 31 is available, step 116 represents determining whether the key has expired by comparing the then current date and time to the expiration date in the record of the key table 99. If the key has expired, compiling terminates. If a source key is available and the key has not expired, the encrypted body 202 is deciphered (by the encryption engine 129) using the source key and the predetermined symmetric encryption algorithm at step 116 to yield the rule file 43.

As discussed, the rule file 85 (and the rule file 43) is a source code or script file. Each data manipulation command within the rule file is: i) a data manipulation command 87 defined within the expression library 83*a*; ii) formatted in a predefined manner for recognition by the preprocessor module 128*a*; and includes arguments (if applicable) that match predefined argument formats that associate with the command 87. As such, parsing of a rule file may be accomplished at step 118 utilizing known parsing techniques.

The steps 119 and 120, representing: i) obtaining the compiling instructions 91*a*; and ii) writing the machine readable instructions 74, may be performed utilizing known techniques for compiling instructions interpretable by a virtual machine.

The data handling executable module 86*a* comprises native machine executable code which, when executed by the processor 20, retrieves the machine readable instructions 74 and, in the process of implementing the machine readable instructions 74, performs the data manipulation commands defined within the rule file 85. As discussed, the data handling executable 86*a* may be a system commonly known as a virtual machine that has been written in native machine executable code for operation by the processor 20.

The above described first embodiment is an implementation typical of virtual machine technology which processes the entire script into a convenient machine-readable format and then interprets (or executes) the machine-readable instructions in the virtual machine. An alternative implementation could include an interpreter often referred to as a "true interpreter" or a "strictly interpretive virtual machine" which does not parse the entire script in advance and compile machine-readable instructions. As such, the "true interpreter" would use the source or human-readable script directly (parsing and reparsing as necessary) for execution. The use of a convenient machine-readable format as an intermediate format represents the evolution in interpreter implementations—increasing the execution performance by doing the relatively time consuming text parsing only once at start up rather than repeatedly during execution. Those skilled in the art will recognize that use of a machine-readable intermediary step or a "true interpreter" are equivalent implementations and, if a "true interpreter" is utilized, the source rule file and the machine readable instructions are the same entity and the preprocessor and the data handling executable are merged.

Figure 6:
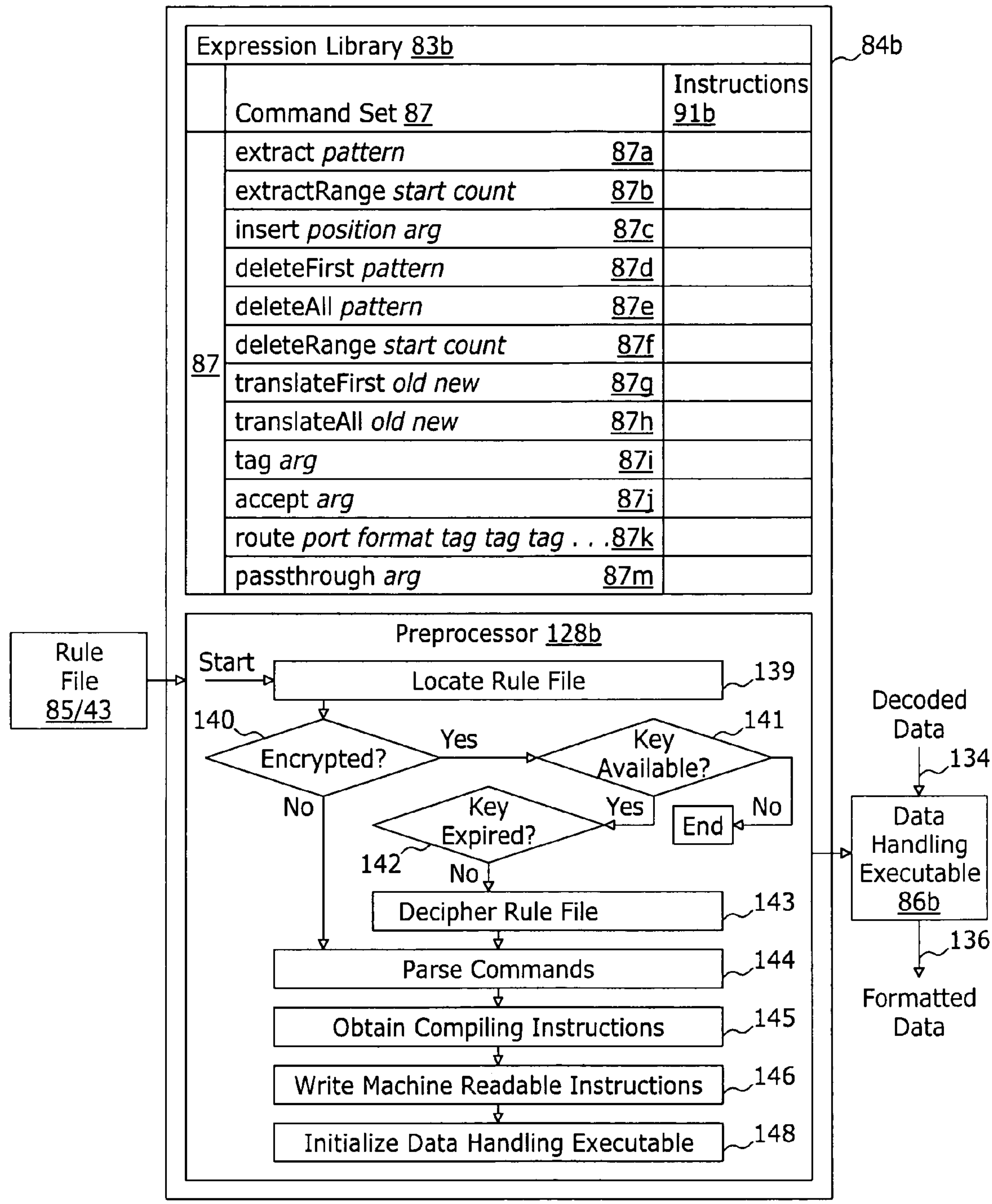
FIG. 6 is a block diagram representing an interpreter module in accordance with a second embodiment of the present invention.

The block diagram of FIG. 6 represents the second embodiment of the present invention wherein the interpreter module 84, referred to as interpreter module 84*b*, compiles the data handling executable file 86*b* in native machine code in accordance with the data manipulation commands of the rule file 85. The interpreter module 84*b* comprises a preprocessor 128*b* and an expression library 83*b*.

The expression library 83*b* comprises the command set 87 recognized by the preprocessor module 128*b*. In association with each data manipulation command 87*a*-87 *m*, the expression library 83*b* includes instructions 91*b* for compiling the data handling executable code, in native machine readable code, for inclusion in the data handling executable file 86*b* such that when executed by the processor 20, the data manipulation command is performed.

The preprocessor module 128*b* comprises native machine executable code which, when executed by the processor 20: i) locates the unprotected rule file 85 or the protected rule file 39 at step 139; ii) deciphers the protected rule file 39 if appropriate at step 143; iii) parses the rule file 85 to obtain the plurality of data manipulation commands within the rule file 85 at step 144; iii) obtains applicable compiling instructions 91*b* from the expression library 83*b* at step 145; iii) compiles the data handling executable file 86*b* at step 146; and starts the data handling executable 86*b* at step 148.

In this second exemplary embodiment the preprocessor module 128*b* is run at power up of the reader 10 and compiles (and loads into memory 70) the data handling executable file 86*b* only at power up.

Similar to the first embodiment, to enable the preprocessor module 128*b* to locate the unprotected rule file 85 or the protected rule file 39 at step 139, the rule file may be distinguishable from other files stored in the non-volatile storage 130 by: i) its storage at a predefined location within the non-volatile storage such as a predetermined directory; ii) its storage under a file name with a predefined extension; and/or ii) its inclusion of predetermined file characteristics such as a header with leading characters that identify the file as a rule file.

Also similar to the first embodiment, to enable the preprocessor module 128*b* to decipher the encrypted body 202 of a protected rule file 39, steps 140 through 143 are preformed. Step 140 represents determining whether the rule file is encrypted. If not, steps 141 through 143 are skipped the unprotected rule file 85 is parsed at step 144. If the rule file is an encrypted rule file 39, step 141 represents determining whether a source key 31 is available in the key table 99 for deciphering the body 202 off the protected rule file 39. More specifically, the preprocessor 128*b* determines whether the key table contains a record with a source key 31 and a source ID 168 which matches the source ID 168 in the header of the encrypted rule file 39. If not, the protected rule file 39 can not be deciphered and compiling terminates. If a source key 31 is available, step 143 represents determining whether the key has expired by comparing the then current date and time to the expiration date in the record of the key table 99. If the key has expired, compiling terminates. If a source key is available and the key has not expired, the encrypted body 202 is deciphered (by the encryption engine 129) using the source key and the predetermined symmetric encryption algorithm at step 143 to yield the rule file 43.

As discussed, the rule file 85 (and the rule file 43) is a source code or script file. Each data manipulation command within the rule file is: i) a data manipulation command 87 defined within the expression library 83*a*; ii) formatted in a predefined manner for recognition by the preprocessor module 128*a*; and includes arguments (if applicable) that match predefined argument formats that associate with the command 87. As such, parsing of a rule file may be accomplished at step 144 utilizing known parsing techniques.

The steps 145 through 148 represent: i) obtaining the compiling instructions 91*b* at step 145; and ii) compiling the generating the data handling executable file 86*b* at step 146; and starting the data handling executable 86*b* at step 148.

Rule File and Operation of Interpreter Module

Figure 7:
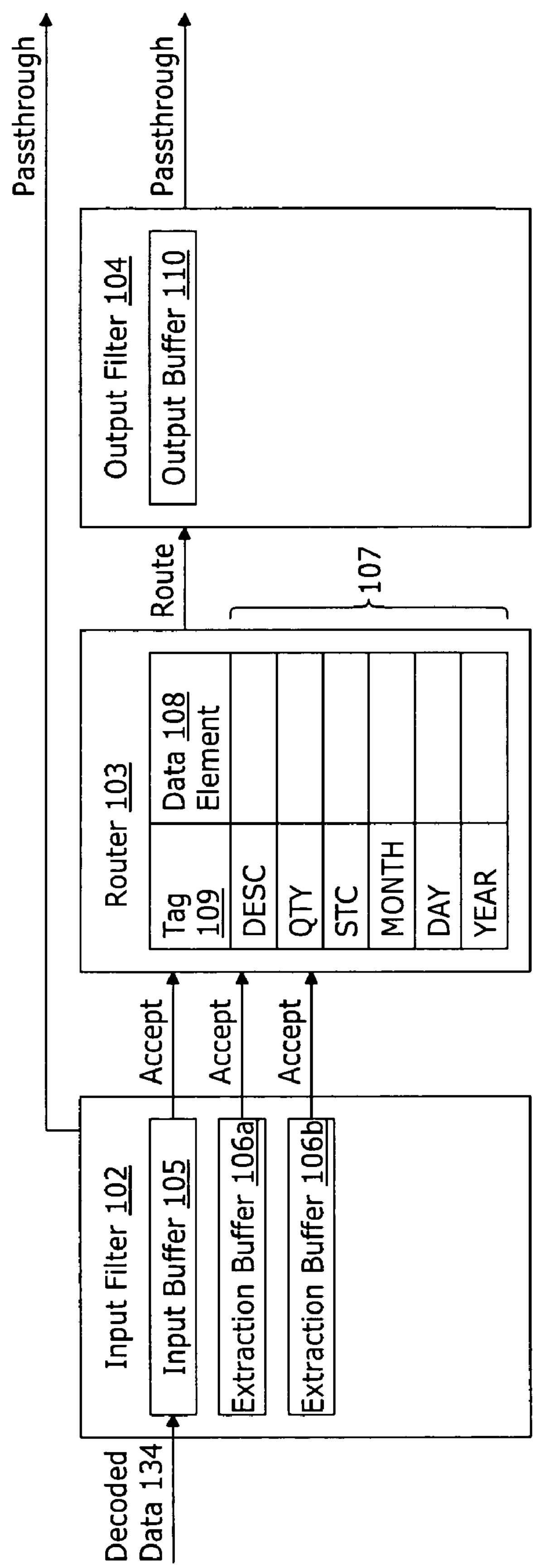
FIG. 7 is a block diagram representing logical components of an interpreter module in accordance with one embodiment of the present invention.

The block diagram of FIG. 7 represents logical structure and operation of the interpreter module 84 which, as discussed manipulates decoded data 134 in accordance with commands set forth in the rule file (after the rule file has been deciphered and compiled). Referring to FIG. 7, the commands within the rule file 85 may be logically structured such that the interpreter module 84 implements a combination of an input filter 102, a router 103, and an output filter 104.

The input filter 102 is a logical group of commands that convert decoded data into predefined data elements 108 and to associate each data element 108 with a predefined label or data tag (such as an XML data tag) 109 which identifies the significance of the data. For example, the input filter 102 may receive a decoded value that represents a calendar date in DD/MM/YY format (such as 31/10/03) and convert the decoded value into three tag/data element pairs: [DAY] 31; [MONTH] 10; and [YEAR] 2003—each of which is stored in a tagged buffer 107 of the router 103.

The router 103 identifies a sequence of tag/data element pairs from the tagged buffer 107 for output. For example, all date data may be sent to a particular legacy application in MMDDYY format. The router 103 exports the tag/data element pairs to the output filter 104 in MONTH, DAY, YEAR order.

The output filter 104 converts the tag/data element pairs into the particular data format for output by the reader, in this example MMDDYY format. In this example, the conversion requires simply removing the data tags.

It should be appreciated that in this exemplary embodiment the reader 10 includes only a single transmission medium (such as a serial link) to only a single application of a remote computer. Therefore, all data (if not discarded) must be routed to such application over such communication circuit. However, in the event that data could be routed to different data output systems, the system may logically include multiple output filters and the router 103 would not only select the order and sequence of tag/data element pairs for output, but would also select the particular output system. A single tag/data element pair may be output in different formats (or the same format) to two or more output systems.

FIG. 8 represents an exemplary unprotected rule file 85 or rule file 43 after decryption. The exemplary rule file is for manipulating date, stock code, and quantity information that is read from a graphical code (for example a two-dimensional data matrix). For purposes of the example, it is assumed that the date, stock code, and quantity information is encoded in the graphical code as a semi-colon delimited file with the first field being a date represented in "mm/dd/yy" format, the second field being a stock code represented by six alphanumeric characters, the third field being a quantity represented by four numeric characters, and the fourth field being a description represented by ten alpha characters.

The exemplary rule file 85/43 of FIG. 8 manipulates the decoded data such that the output of the reader 10 is a comma delimited data stream that includes, in sequence, the date (in dd/mm/yyyy) format, the stock code, and the quantity.

As discussed, the rule file 85/43 may be a source code script file or other human readable data file. The contents of the rule file 85/43 describes various data translation and routing instructions utilizing a pre-defined programming language recognized by the interpreter module. More specifically, and with reference to FIG. 9, the pre-defined programming language comprises a plurality of data manipulation commands 87*a*-87*m* which, in the aggregate form a command set 87. The command set 87 is the universe of data manipulation commands that may be included within a rule file 85. The exemplary data manipulation commands within the command set 87 include:

Command 87*a* represents a command called "extract" and it includes a single argument referred to as "pattern". The "extract" command is a command to extract the portion of the data that matches the "pattern" and writes such extracted data to the extraction buffer. The matching criteria of the "extract" command is that the data must have the defined "pattern". The argument "pattern" may be defined as a regular expression—as is known in the art of text processing.

Command 87*b* represents a command called "extractRange" and it includes an argument referred to as "start" and an argument referred to as "count". The "extractRange" command is a command to extract a portion of the data that is "count" number of characters in length beginning at the position "start" and write such extracted data to the extraction buffer. Each of "start" and "count" are numerical values.

Command 87*c* represents a command called "insert" and it includes an argument referred to as "position" and an argument referred to as "arg". The "insert" command is a command that inserts the specified "arg" at the specified "position". The specified "position" may be a number specifying the character position or it may be a predefined expression such as "beginning", "end", or "extracted"—which is the point of the most recent extraction. "arg" may be a specified character string or may identify a buffer (such as the extraction buffer), or predefined system variable (such as a system time) which includes a character sting for insertion.

Command 87*d* represents a command called "deleteFirst". The "deleteFirst" command includes a single argument referred to as "pattern". The "deleteFirst" command is a command that deletes the first instance of the specified "pattern". The argument "pattern" may be defined as regular expression.

Command 87*e* represents a command called "deleteAll". The "deleteAll" command includes a single argument referred to as "pattern". The "deleteAll" command is a command that deletes all instances of the specified "pattern" within the data. Again, the argument "pattern" may be defined as a regular expression.

Command 87*f* represents a command called "deleteRange". The "deleteRange" command includes arguments referred to as "start" and an argument referred to as "count". The "deleteRange" command is a command to delete a portion of the data that is "count" number of characters in length beginning at the position "start". Each of "start" and "count" are numerical values.

Command 87*g* represents a command called "translateFirst". The "translateFirst" command includes arguments referred to as "old" and "new". The argument "old" may be a pattern defined as a regular expression. The argument "new" is a character string. The "translateFirst" command replaces the first instance of the "old" pattern with the specified "new" character string.

Command 87*h* represents a command called "translateAll". The "translateAll" command includes arguments referred to as "old" and "new". Again, the argument "old" may be a pattern defined as a regular expression. The argument "new" is a character string. The "translateFirst" command replaces all instances of the "old" pattern with the specified "new" character string.

Command 87*i* represents a command called "tag". The "tag" command includes a single argument referred to as "arg" which is a character string. The "tag" command sets the XML tag associated with data to "arg" as the specified tag.

Command 87*j* represents a command called "accept". The "accept" command posts the current tag and data element pair to a router 103 (discussed later).

Command 87*k* represents a command called "route". The "route" command includes an argument referred to as "port", an argument referred to as "format", and a plurality of arguments each referred to as "tag". The "route" command posts the tag and data element pair for each identified "tag" to an output buffer of the output filter 106 (discussed later) for formatting in accordance with the “format” argument and subsequent output on the port identified in the “port” argument.

Command 87*m* represents a command called “passthrough”. The “passthrough” command includes a single argument referred to as “arg”. The argument “arg” may designate a buffer (such as the input buffer 105, one of the extraction buffers 106*a* or 106*b*, or the output buffer 110), content associated with a tag 109 (e.g. “$tagName”), a literal string (e.g. “text”), or predefined system variable (e.g. a variable such as time). The “passthrough” command passes the argument to the port previously identified in a route command or, if not designated, to the default port which, in the exemplary reader 10 is the communication module 26 for transmission to the remote data collection system.

It should be appreciated that each of the above described data manipulation commands is an exemplary command only. Those skilled in the art will recognize the benefit of including additional data manipulation commands within a command set 87 when implementing the present invention.

Returning to FIG. 5, the commands within the exemplary rule file 85/43 are organized in a nested pattern with second level rule only being applied if the first level rule is applicable. For example, rule 200 is a first level command and is applied to data within the input buffer 106. Rule 210, 220, 230, and 240 are second level rules and are applied only to the data extracted by rule 200 as it exists in the extraction buffer 106*a*. This type of nested structure may be designated by a specific rule format.

On a logical basis, all of the commands shown in FIG. 9 are logically commands within the input filter 102 because such commands are for the purpose of extracting and manipulating data from the graphical barcode which is passed through to the default output port by the “passthrough” commands 216, 217, 223, 224, and 233 without being tagged to the router 103 (by “tag” and “accept” commands) and routed to the output filter 104 (by a “route” command).

As discussed, for purposes of illustrating this example, it is assumed that the decoder 72 will output the decoded value of the graphical code as a semicolon delimited file into the input buffer 105.

Following the decoder 72 writing the result to the input buffer 105, the data handling executable, following the machine readable instructions 74, executes the data manipulation commands 200-241 set forth in the exemplary rule file 85 as follows.

Command 200 is the “extract” command 87*a*. The “extract” command 87*a* is a data manipulation that extracts an argument referred to as “pattern” from the applicable buffer. In this case, because the command 200 is a first level command the relevant buffer is the input buffer 105. The “pattern”, in this example, is a sequence of characters as represented by “.+”—with the “dot” being a “wild card” indicating any character and the “+” indicating one or more of the preceding. As such, command 200 will bring all data from the input buffer 105 to the extraction buffer 106*a*. The purpose of having command 200 is such that all subsequent manipulations are second level commands. Therefore, all subsequent operations can be “turned off” simply by disabling command 200 such that it matches nothing.

Command 210 is also an “extract” command 87*a*. In this case, because the command 210 is a second level command, the relevant buffer is the first level extraction buffer 106*a* (containing the results of the extraction at command 200). The “pattern” is a sequence of any two digits (0-9), followed by “/”, followed by any two digits (0-9), followed by “/”, followed by any two digits (0-9), followed by either a “;” or the end of the data. This sequence must be either at the beginning of the data or following a “;”. This pattern corresponds to the date field, which as discussed, is formatted in the graphical code as “mm/dd/yy”. The result of executing command 210 is to extract the “mm/dd/yy” pattern and its preceding and/or trailing “;” to the second level extraction buffer 106*b*.

Command 211 is a “deleteAll” command 87*e* at the third level of nesting and as such, is operating on the second level extraction buffer 106*b*. The “deleteFirst” command 87*e* is a data manipulation command that deletes all instances of the argument referred to as “pattern”. The “pattern” for deletion by command 211 is the “;” which may exist either before or after the “mm/dd/yy” pattern in the second level extraction buffer 106*b*.

Command 212 is an “extractRange” command 87*f*. The “extractRange” command 87*f* is a data manipulation command to extract a portion of the data that is “count” number of characters in length beginning at the position “start”. In this example, “start” is the first position and “count” is three characters. This results in extracting the three characters representing “mm/” to the third level extraction buffer 106*c*.

Command 213 is an “insert” command 87*c* at the third level of nesting such that it is operating on the second level extraction buffer 106*b*. The “insert” command 87*c* inserts at a specified position (in this example position 4) a specified string (in this example “the contents just extracted which is sitting in the third level extraction buffer 106*c*). This insertion results in the extraction buffer 106*b* now containing “mm/” inserted after “dd/” such that the contents of the buffer 106*b* is “dd/mm/yy”.

Command 214 is also “insert” command 87*c* at the second level of nesting. Command 214 inserts, at position 7 of the second level extraction buffer 106*b*, the string “20”. This results in converting the two-digit year to a four-digit year with the assumption that the year is more recent than 2000. Following execution of command 214, the second level extraction buffer 106*b* now contains “dd/mm/20yy”.

Command 215 is a “passthrough” command 87*m*. The “passthrough” command 87*m* passes the “arg” to the default output port. Because the “arg” is buffer and because command 215 is a second level command, the contents of the second level extraction buffer 106*b* are passed to the default output port.

Command 216 is also a “passthrough” command 87*m*. Command 216 passes the literal string “,” to the default output port.

Command 220 is also an “extract” command 87*a*. Again, because the command 220 is a second level command, the relevant buffer is the first level extraction buffer 106*a* (containing the results of the extraction at command 200). The “pattern” is a sequence of any six alpha numeric characters (e.g. characters between 0-9, A-Z, and a-z) followed by either a “;” or the end of the data. This sequence must be either at the beginning of the data or following a “;”. This pattern corresponds to the stock code field of the data encoded in the graphical code, which as discussed, is formatted as six alphanumeric characters. The result of executing command 220 is to extract the six alpha-numeric characters and the preceding and/or trailing “;” to the second level extraction buffer 106*b*.

Command 221 is a “deleteAll” command 87*e*. Command 221, like command 211, deletes the preceding and/or trailing “;” from the extracted stock code in the second level extraction buffer 106*b*.

Commands 222 and 223 are both “passthrough” commands 87*m*. Command 222, like command 215 passes the contents of the second level extraction buffer 106*b* to the default output port. And, command 223, like command 216, passes the literal string "," to the default output port.

Command 230 is also an "extract" command 87*a*. Again, because the command 230 is a second level command, the relevant buffer is the first level extraction buffer 106*a* (containing the results of the extraction at command 200). The "pattern" is a sequence of any four numeric characters (e.g. characters between 0-9) followed by either a semicolon or be the end of the data. Again, the sequence must be either at the beginning of the data or following a semicolon. This pattern corresponds to the quantity field of the data encoded in the graphical code, which as discussed, is formatted as four numeric characters. The result of executing command 230 is to extract the four numeric characters and the preceding and/or trailing semicolons to the second level extraction buffer 106*b*.

Command 231 is a "deleteAll" command 87*e*. Command 231, like command 211, deletes the preceding and/or trailing semicolons from the extracted quantity in the second level extraction buffer 106*b*.

Commands 232 is a "passthrough" command 87*m*. Command 232, like command 215 passes the contents of the second level extraction buffer 106*b* to the default output port. Note that no additional comma is passed after the quantity because the quantity is the last item in the comma delimited data passed from the reader 10.

It should be appreciated that the result of performing rule 200-233 is the passing of "dd/mm/20yy, stock code, quantity" to the default output port:

Command 240 is also an "extract command 87*a*. Again, because the command 230 is a second level command, the relevant buffer is the first level extraction buffer 106*a* (containing the results of the extraction at command 200). The "pattern" is any characters (the same extraction pattern as command 200). The purpose of command 240 followed by the "deleteFirst" command 241 is to delete any data remaining in the first level extraction buffer 106*a*. This prevents such data from being output by default.

Although the invention has been shown and described with respect to certain preferred embodiments, it is obvious that equivalents and modifications will occur to others skilled in the art upon the reading and understanding of the specification.

For example, the rule file, in the exemplary embodiment, is a source code or script file written in human perceivable form. However, those skilled in the art will recognize that a rule file 85 can be partially compiled or written in a machine readable form prior to loading into the non-volatile storage 130. In which case, the command set 87 would include machine readable commands rather than human perceivable commands.

In another example, the first embodiment of the invention compiles a machine readable instruction file for directing operation of a data handling executable file and the second embodiment compiles a native machine code data handling executable file in accordance with the rule file. Those skilled in the art will recognize that there are varying levels of interpretable and executable code that exist between human perceivable source code and machine code and any such level may be chosen without deviating form the scope of the present invention.

It is envisioned that after reading and understanding the present invention those skilled in the art may envision other processing states, events, and processing steps to further the objectives of the present invention. The present invention includes all such equivalents and modifications, and is limited only by the scope of the following claims.

What is claimed is:

1. A data collection device for reading a machine readable data storage medium comprising data encoded in a readable format, the data collection device comprising:

a) a non-volatile memory storing a reader ID and a public key;

b) a processor operating an embedded decoder system comprising a decoder module and an interpreter module;

i) the decoder module receiving digital data from a medium reading system, the digital data comprising a representation of the machine readable data storage medium, determining the data encoded in the machine readable data storage medium, and generating decoded data; and ii) the interpreter module receiving the decoded data and manipulating the decoded data in accordance with the plurality of data manipulation commands defined in a rule file to generate formatted data, the interpreter module obtaining the rule file by:

receiving a protected rule file, the protected rule file comprising an encrypted representation of the rule file;

receiving a license file, the license file comprising an encrypted representation of a license record, the license record comprising identification of an authorized reader, a source identifier, and a source license key;

deciphering the license record using the public encryption key and a predetermined asymmetric encryption algorithm; and if the identification of an authorized reader matches the reader ID, deciphering the protected rule file using the source license key to recover the rule file.

2. The data collection device of claim 1, further comprising a communication module coupled to the processor and transferring the formatted data to a remote system.

3. The data collection device of claim 1, wherein:

the reading system captures encoded data of a machine readable data storage medium which includes encoded data representing the license file;

the decoder module receives digital data from the reading system representing the license file; and the interpreter module receives decode data representing the license file and includes a license file handling module for:

recognizing the presence of a license file within decoded data;

obtaining the public encryption key and deciphering the license record of the license file; and storing the source license key in combination with the source identification if the reader ID matches the identification of an authorized reader from the license record.

4. The data collection device of claim 3, wherein the license file handling module only stores the source license key in combination with the source identification if an expiration date of the license record has not yet passed.

5. The data collection device of claim 1, wherein:

the reading system further captures encoded data of a machine readable data storage medium which includes encoded data representing the protected rule file;

the decoder module receives digital data from the reading system representing the protected rule file; and the interpreter module receives decoded data representing the protected rule file and includes a preprocessor for:

recognizing the presence of a protected rule file within decoded data;

determining the source identification associated with the protected rule file;

obtaining the source license key associated with the source identification; and deciphering the protected rule file using the source license key to recover the rule file.

6. The data collection device of claim 5 wherein:

the interpreter module 84 comprises an expression library, the expression library including a plurality of data manipulation commands and, in association with each of the plurality of data manipulation commands, an instruction for performing the data manipulation command; and the interpreter module provides for manipulating the decoded data by, for each data manipulation defined in the rule file, performing the instruction associated with the data manipulation.

7. The data collection device of claim 6, wherein:

the reading system captures encoded data of a machine readable data storage medium which includes encoded data representing the license file;

the decoder module receives digital data from the reading system 21 representing the license file; and the interpreter module receives decode data representing the license file and includes a license file handling module for:

recognizing the presence of a license file within decoded data;

obtaining the public encryption key and deciphering the license record of the license file; and storing the source license key in combination with the source identification if the reader ID matches the identification of an authorized reader from the license record.

8. The data collection device of claim 7, wherein the license file handling module only stores the source license key in combination with the source identification if an expiration date of the license record has not yet passed.

9. A system for reading a machine readable data storage medium comprising data encoded in a readable format and generating formatted data, the formatted data comprising the decoded data manipulated in accordance with data manipulation rules of a rule file; the system comprising:

a protected rule file creation system for:

generating the rule file;

encrypting the rule file to generate a protected rule file which, when deciphered using a source key yields the rule file; and generating a license record, the license record comprising the source key and a source identifier;

a trusted license file distribution system for encrypting the license record using a private key of a public/private key pair to generate a license file; and a data collection device for reading the machine readable data storage medium, the data collection device comprising:

a non-volatile memory storing a reader ID and a public key of the public/private key pair;

a processor operating an embedded decoder system comprising a decoder module and an interpreter module;

the decoder module receiving digital data from a medium reading system, the digital data comprising a representation of the machine readable data storage medium, determining the data encoded in the machine readable data storage medium, and generating decoded data; and the interpreter module receiving the decoded data and manipulating the decoded data in accordance with the plurality of data manipulation commands defined in a rule file to generate formatted data, the interpreter module obtaining the rule file by:

receiving the protected rule file;

receiving the license file;

deciphering the license record using the public encryption key; and if the identification of an authorized reader matches the reader ID, deciphering the protected rule file using the source license key to recover the rule file.

10. The system of claim 9, wherein:

the reading system captures encoded data of a machine readable data storage medium which includes encoded data representing the license file;

the decoder module receives digital data from the reading system 21 representing the license file; and the interpreter module receives decode data representing the license file and includes a license file handling module for:

recognizing the presence of a license file within decoded data;

obtaining the public encryption key and deciphering the license record of the license file; and storing the source license key in combination with the source identification if the reader ID matches the identification of an authorized reader from the license record.

11. The system of claim 10, wherein:

the license record further comprises an expiration date; and the license file handling module only stores the source license key in combination with the source identification if an expiration date of the license record has not yet passed.

12. The system of claim 9, wherein:

the reading system further captures encoded data of a machine readable data storage medium which includes encoded data representing the protected rule file;

the decoder module receives digital data from the reading system representing the protected rule file; and the interpreter module receives decode data representing the protected rule file and includes a preprocessor for:

recognizing the presence of a protected rule file within decoded data;

determining the source identification associated with the protected rule file;

obtaining the source license key associated with the source identification; and deciphering the protected rule file using the source license key to recover the rule file.

13. The system claim 12, wherein:

the interpreter module 84 comprises an expression library, the expression library including a plurality of data manipulation commands and, in association with each of the plurality of data manipulation commands, an instruction for performing the data manipulation command; and the interpreter module provides for manipulating the decoded data by, for each data manipulation defined in the rule file, performing the instruction associated with the data manipulation.

14. The system of claim 13, wherein:

the reading system captures encoded data of a machine readable data storage medium which includes encoded data representing the license file;

the decoder module receives digital data from the reading system 21 representing the license file; and the interpreter module receives decode data representing the license file and includes a license file handling module for:

recognizing the presence of a license file within decoded data;

obtaining the public encryption key and deciphering the license record of the license file; and storing the source license key in combination with the source identification if the reader ID matches the identification of an authorized reader from the license record.

15. The system of claim 14, wherein the license file handling module only stores the source license key in combination with the source identification if an expiration date of the license record has not yet passed.

16. A method of operating a data collection device for reading a machine readable data storage medium comprising data encoded in a readable format, the method comprising:

storing a reader ID and a public key in a non-volatile storage of the data collection device;

detecting the machine readable data storage medium and determining the data encoded in the machine readable data storage medium to generate decoded data; and obtaining a rule file by:

receiving a protected rule file, the protected rule file comprising an encrypted representation of the rule file;

receiving a license file, the license file comprising an encrypted representation of a license record, the license record comprising identification of an authorized reader, a source identifier, and a source license key;

deciphering the license record using the public encryption key and a predetermined encryption algorithm; and if the identification of an authorized reader matches the reader ID, deciphering the protected rule file using the source license key to recover the rule file; and manipulating the decoded data in accordance with a plurality of data manipulation commands defined in the rule file to generate formatted data.

17. The method of claim 16, further comprising transferring the formatted data to a remote system.

18. The method of claim 16, wherein:

the license file is received by:

capturing encoded data of a machine readable data storage medium which includes an encoded data representing the license file and generating decoded data representing the license file;

recognizing the presence of a license file within decoded data; and the method further compromises storing the source license key in combination with the source identification if the reader ID matches the identification of an authorized reader from the license record after deciphering the license record of the license file using the public encryption key.

19. The method of claim 18, wherein the source license key in combination with the source identification is only stored if an expiration date of the license record has not yet passed.

20. The method of claim 16, wherein the protected rules file is received by:

capturing encoded data of a machine readable data storage medium which includes encoded representation of the protected rules file and generating decoded data representing the protected rules file;

recognizing the presence of a protected rule file within decoded data; and determining the source identification associated with the protected rule file;

obtaining the stored source license key associated with the source identification; and deciphering the protected rule file using the source license key to recover the rule file.

21. The method of claim 20, wherein:

manipulating the decoded data to generate the formatted data comprises, for each data manipulation defined in the rule file, performing an instruction associated with the data manipulation in an expression library.

22. The method of claim 21, wherein:

the license file is received by:

capturing encoded data of a machine readable data storage medium which includes encoded data representing the license file and generating decoded data representing the license file;

recognizing the presence of a license file within decoded data; and the method further compromises storing the source license key in combination with the source identification if the reader ID matches the identification of an authorized reader from the license record after deciphering the license record of the license file using the public encryption key.

23. The method of claim 22, wherein the source license key in combination with the source identification is only stored if an expiration date of the license record has not yet passed.

* * * * *

UNITED STATES PATENT AND TRADEMARK OFFICE

CERTIFICATE OF CORRECTION

PATENT NO. : 7,621,453 B2
APPLICATION NO. : 11/361065
DATED : November 24, 2009
INVENTOR(S) : Hepworth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this

Fourteenth Day of December, 2010

David J. Kappos

*Director of the United States Patent and Trademark Office*